US009250084B2

(12) United States Patent  
Shaffer et al.

(10) Patent No.: US 9,250,084 B2  
(45) Date of Patent: Feb. 2, 2016

(54) SYSTEM AND METHOD FOR NAVIGATING USING MULTIPLE MODALITIES

(75) Inventors: Shmuel Shaffer, Palo Alto, CA (US); Labhesh Patel, San Francisco, CA (US); Bruce D. Moon, Dublin, CA (US); Shantanu Sarkar, San Jose, CA (US); Gebran G. Chahrouri, Menlo Park, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1950 days.

(21) Appl. No.: 11/837,331

(22) Filed: Aug. 10, 2007

(65) Prior Publication Data

US 2009/0043502 A1 Feb. 12, 2009

(51) Int. Cl.
| | |
|---|---|
| G08G 1/123 | (2006.01) |
| G01C 21/20 | (2006.01) |
| G01C 21/26 | (2006.01) |
| G01S 19/48 | (2010.01) |
| G08B 13/14 | (2006.01) |

(52) U.S. Cl.
CPC .............. *G01C 21/20* (2013.01); *G01C 21/206* (2013.01); *G01C 21/26* (2013.01); *G01S 19/48* (2013.01)

(58) Field of Classification Search
CPC ....... G01S 13/878; G01S 1/68; G01S 5/0289; G01S 13/767; G01S 13/78; G01S 19/10; G01S 5/0027; G06K 7/10386
See application file for complete search history.

(56) References Cited

U.S. PATENT DOCUMENTS

| | | | |
|---|---|---|---|
| 5,214,789 A | 5/1993 | George | |
| 5,457,680 A | 10/1995 | Kamm | |
| 5,488,608 A | 1/1996 | Flammer, III | |
| 5,574,775 A | 11/1996 | Miller, II et al. | |
| 5,613,213 A | 3/1997 | Naddell et al. | |
| 5,804,810 A * | 9/1998 | Woolley ................ | G01S 5/0289 235/375 |
| 5,857,153 A | 1/1999 | Lupien | |
| 5,915,214 A | 6/1999 | Reece et al. | |
| 5,959,568 A * | 9/1999 | Woolley ................ | G01S 5/0289 235/385 |
| 5,990,826 A * | 11/1999 | Mitchell ................ | G01S 1/042 342/357.64 |
| 6,052,598 A | 4/2000 | Rudrapatna et al. | |

(Continued)

OTHER PUBLICATIONS

George Cheng Yu, et al., "*Method and Device for Roaming Between Wireless Networks*," patent application and drawings filed Jun. 8, 2004; U.S. Appl. No. 10/863,306; 26 pages.

(Continued)

*Primary Examiner* — Ryan Zeender  
*Assistant Examiner* — Dana Amsdell  
(74) *Attorney, Agent, or Firm* — Baker Botts L.L.P.

(57) ABSTRACT

A system for navigating includes an interface operable to receive position information of a first modality. The position information of the first modality is associated with a navigation unit. The interface is further operable to receive position information of a second modality. The position information of the second modality is associated with the navigation unit. The system also includes a processor coupled to the interface and operable to identify a destination. The system is further operable to navigate to the destination based on the position information of the first and second modalities by switching between the first modality and the second modality.

36 Claims, 2 Drawing Sheets

(56) References Cited

U.S. PATENT DOCUMENTS

| | | |
|---|---|---|
| 6,249,252 B1 | 6/2001 | Dupray |
| 6,400,946 B1 | 6/2002 | Vazvan et al. |
| 6,438,136 B1 | 8/2002 | Bahl |
| 6,445,701 B1 | 9/2002 | Bahl |
| 6,456,825 B1 | 9/2002 | Lowden |
| 6,507,587 B1 | 1/2003 | Bahl |
| 6,510,323 B1 | 1/2003 | Stocker et al. |
| 6,512,478 B1* | 1/2003 | Chien ............... G01S 5/0215 340/572.1 |
| 6,519,004 B1 | 2/2003 | Bahl |
| 6,577,946 B2 | 6/2003 | Myr |
| 6,611,507 B1 | 8/2003 | Hottinen et al. |
| 6,614,392 B2 | 9/2003 | Howard ................ 342/357.07 |
| 6,618,363 B1 | 9/2003 | Bahl |
| 6,625,135 B1 | 9/2003 | Johnson et al. |
| 6,628,941 B2 | 9/2003 | Knoblach et al. |
| 6,728,540 B1 | 4/2004 | DeSantis et al. |
| 6,742,177 B1 | 5/2004 | Dorak, Jr. et al. |
| 6,754,266 B2 | 6/2004 | Bahl et al. |
| 6,771,609 B1 | 8/2004 | Gudat et al. |
| 6,819,268 B2 | 11/2004 | Wakamatsu et al. |
| 6,847,822 B1 | 1/2005 | Dennison et al. |
| 6,859,791 B1 | 2/2005 | Spagna et al. |
| 6,868,270 B2 | 3/2005 | Dent |
| 6,871,215 B2 | 3/2005 | Smith et al. |
| 6,879,838 B2 | 4/2005 | Rankin |
| 6,891,811 B1 | 5/2005 | Smith et al. |
| 6,900,762 B2* | 5/2005 | Andrews ............... G01S 5/0036 342/386 |
| 6,952,181 B2 | 10/2005 | Karr et al. |
| 6,998,965 B1 | 2/2006 | Luciano, Jr. et al. ..... 340/323 R |
| 7,009,994 B2 | 3/2006 | Bahl |
| 7,075,943 B2 | 7/2006 | Bahl |
| 7,085,571 B2 | 8/2006 | Kalhan et al. |
| 7,092,719 B2 | 8/2006 | Khan |
| 7,110,753 B2 | 9/2006 | Campen |
| 7,110,773 B1 | 9/2006 | Wallace et al. |
| 7,127,264 B2 | 10/2006 | Hronek et al. |
| 7,283,846 B2* | 10/2007 | Spriestersbach et al. ..... 455/566 |
| 7,295,114 B1* | 11/2007 | Drzaic ................ A62B 99/00 235/385 |
| 7,359,674 B2 | 4/2008 | Markki et al. |
| 7,375,634 B2* | 5/2008 | Sprague ............... G06Q 10/047 340/572.1 |
| 7,382,756 B2 | 6/2008 | Barber et al. |
| 7,480,567 B2* | 1/2009 | Suomela et al. ............. 701/211 |
| 7,570,164 B2* | 8/2009 | Chakraborty ........... G06F 21/56 340/10.1 |
| 7,616,117 B2* | 11/2009 | Streeb et al. ................ 340/572.1 |
| 7,672,780 B2* | 3/2010 | Kim ................ G01C 21/3415 340/995.1 |
| 7,701,342 B2* | 4/2010 | Chen ....................... G01C 21/20 340/539.1 |
| 7,868,738 B2* | 1/2011 | Dasgupta .............. G06F 9/4443 340/10.32 |
| 7,877,166 B2* | 1/2011 | Harwig ................ G05D 1/0261 700/245 |
| 8,127,984 B2* | 3/2012 | Zatloukal ............ G06K 7/0008 235/375 |
| 2002/0057340 A1 | 5/2002 | Fernandez et al. |
| 2002/0103781 A1* | 8/2002 | Mori .................. G06F 17/3087 |
| 2002/0128004 A1 | 9/2002 | Kanerva |
| 2002/0187780 A1 | 12/2002 | Souissi |
| 2003/0013454 A1 | 1/2003 | Hunzinger |
| 2003/0069043 A1 | 4/2003 | Chhaochharia et al. |
| 2003/0080901 A1* | 5/2003 | Piotrowski ............. G01C 21/20 342/386 |
| 2003/0149526 A1* | 8/2003 | Zhou et al. ............... 701/213 |
| 2003/0182056 A1 | 9/2003 | Nozaki et al. |
| 2003/0232633 A1 | 12/2003 | Iida |
| 2004/0027243 A1* | 2/2004 | Carrender ............ G01C 21/20 340/568.1 |
| 2004/0061646 A1* | 4/2004 | Andrews ............... G01S 5/0036 342/463 |
| 2004/0137901 A1 | 7/2004 | Hamasaki et al. |
| 2004/0185863 A1* | 9/2004 | Ogami ..................... 455/452.1 |
| 2004/0203831 A1 | 10/2004 | Khan |
| 2004/0266457 A1 | 12/2004 | Dupray |
| 2005/0143916 A1* | 6/2005 | Kim et al. ................. 701/214 |
| 2005/0258962 A1* | 11/2005 | Phipps ............... G06K 7/10386 340/572.1 |
| 2006/0129308 A1* | 6/2006 | Kates ...................... A61H 3/061 701/532 |
| 2006/0135183 A1* | 6/2006 | Zavada et al. ................. 455/457 |
| 2006/0158329 A1* | 7/2006 | Burkley et al. ........... 340/539.13 |
| 2006/0271274 A1* | 11/2006 | Saarikivi ................ G01C 21/00 701/433 |
| 2007/0001904 A1* | 1/2007 | Mendelson ................ 342/450 |
| 2007/0013516 A1* | 1/2007 | Freitag ...................... G01S 1/68 340/572.1 |
| 2007/0013519 A1* | 1/2007 | Chung ............... G08B 13/2462 340/572.1 |
| 2007/0018820 A1* | 1/2007 | Chand et al. ................. 340/572.1 |
| 2007/0030152 A1* | 2/2007 | Sprague ................. G08B 7/066 340/572.1 |
| 2007/0210923 A1* | 9/2007 | Butler .................. G06K 7/0008 340/572.8 |
| 2008/0252459 A1* | 10/2008 | Butler .................. G06K 7/0008 340/572.1 |
| 2009/0132158 A1* | 5/2009 | Sironi et al. .................. 701/200 |

OTHER PUBLICATIONS

Alex Varshavsky, et al.; "Are GSM Phones the Solution for Localization?" http://www.cs.toronto.edu/~walex/papers/are_gsm_phones_the_solution_for_localization_wmcsa2006.pdf; 6 pages.

Yusuke Konishi; "Mobile and Seamless Positioning: Technology to get one's position at anytime and anywhere," http://shiba.iis.u-tokyo.ac.jp/labsemi2003/030708_d3_konishi.pdf; 4 pages.

Kay Kitazawa, "A Study on Measurement System for Modeling of Migration Activities of Shoppers," University of Tokyo, Center for Spatial Information Sciences; 28 pages.

Hae Don Chon, et al., "Using RFID for Accurate Positioning," Journal of Global Positioning Systems; vol. 3, No. 1-2: pp. 32-39.

"RFID Technology PHS Location System;" RFIDa; http://www.rfida.com/nb/phs.htm; 8 pages.

RFIDNews and RFID Operations; GPS VeriChip; http://www.rfidnews.org/weblog/2004/12/23/gps-verichip/; printed Aug. 10, 2007; 2 pages.

Office Action for U.S. Appl. No. 10/863,306, Jan. 6, 2006.
Final Office Action for U.S. Appl. No. 10/863,306, Aug. 24, 2006.
Advisory Action for U.S. Appl. No. 10/863,306, Nov. 29, 2006.
Office Action for U.S. Appl. No. 10/863,306, Jan. 26, 2007.
Final Office Action for U.S. Appl. No. 10/863,306, Jul. 2, 2007.
Advisory Action for U.S. Appl. No. 10/863,306, Dec. 13, 2007.
Office Action for U.S. Appl. No. 10/863,306, May 27, 2008.
Final Office Action for U.S. Appl. No. 10/863,306, Dec. 15, 2008.
Advisory Action for U.S. Appl. No. 10/863,306, Mar. 5, 2009.
Office Action for U.S. Appl. No. 10/863,306, Aug. 19, 2009.
Final Office Action for U.S. Appl. No. 10/863,306, Feb. 22, 2010.
Office Action for U.S. Appl. No. 10/863,306, Sep. 21, 2010.
Final Office Action for U.S. Appl. No. 10/863,306, Mar. 3, 2011.

* cited by examiner

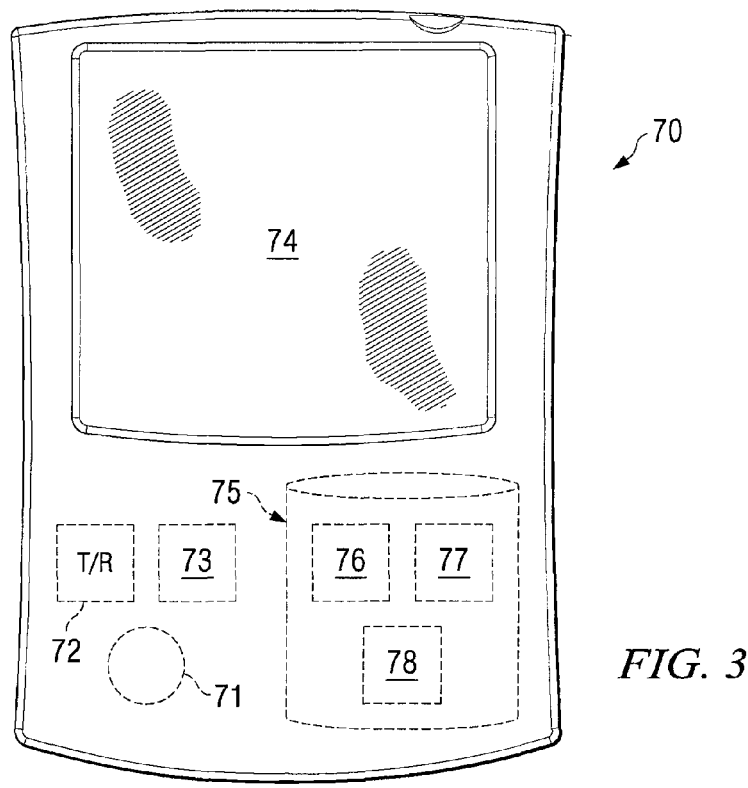
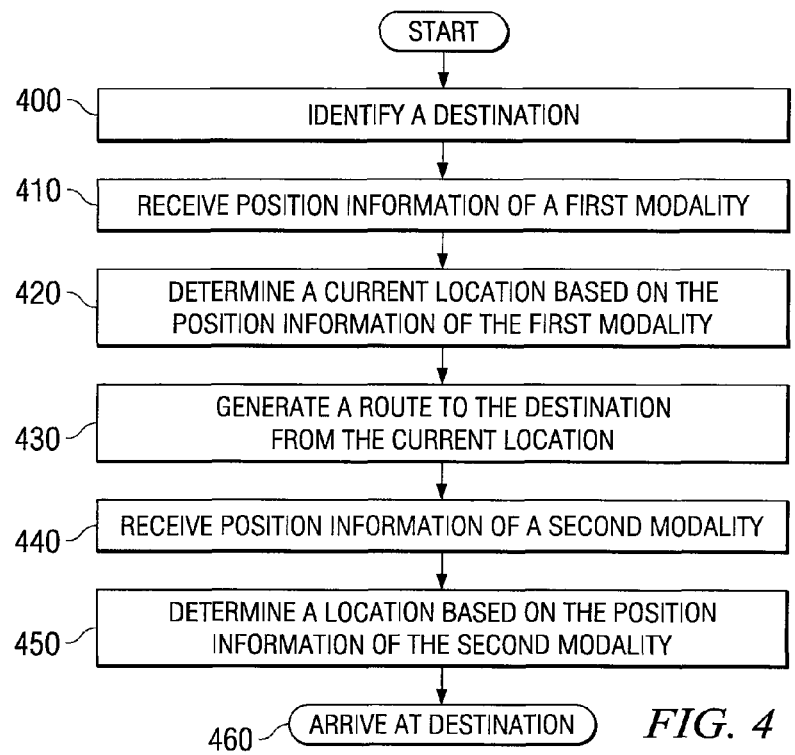
FIG. 3
FIG. 4

SYSTEM AND METHOD FOR NAVIGATING USING MULTIPLE MODALITIES

TECHNICAL FIELD

The present disclosure relates generally to communication systems and, more particularly, to a system and method for navigating using multiple modalities.

BACKGROUND

Navigation and location technologies, such as the Global Positioning System (GPS) may support numerous services such as routing a user to a destination. GPS systems operate by determining the position of a receiver or transmitter relative to a remote transmitter/receiver having a known location. For accuracy, navigation and location identification systems typically require that the navigation device be able to communicate with a minimum of three remote transmitters/receivers. In the case of GPS, a direct line of sight is also necessary.

BRIEF DESCRIPTION OF THE DRAWINGS

For a more complete understanding of the present disclosure and its advantages, reference is now made to the following description, taken in conjunction with the accompanying drawings in which:

FIG. 3 is a simplified block diagram illustrating an interoperable navigation unit in accordance with a particular embodiment; and FIG. 4 is a flow chart illustrating a method for navigating using multiple modalities according to an embodiment.

DESCRIPTION OF EXAMPLE EMBODIMENTS

Overview

In an embodiment, a system for navigating includes an interface operable to receive position information of a first modality. The position information of the first modality is associated with a navigation unit. The interface is further operable to receive position information of a second modality. The position information of the second modality is associated with the navigation unit. The system also includes a processor coupled to the interface and operable to identify a destination. The system is further operable to navigate to the destination based on the position information of the first and second modalities by switching between the first modality and the second modality.

The position information of a first modality may be associated with a global positioning system (GPS) system and the position information of a second modality may be associated with a radio frequency identification (RFID) network. The system may also include a memory operable to store a map associated with a RFID network. The map may be associated with a building and the destination may be a location within the building. The processor may be operable to determine a location of the navigation unit based on the map associated with the RFID network.

A method for navigating includes identifying a destination and receiving position information of a first and a second modality. The position information of the first modality and the second modality is associated with a navigation unit. The method also includes navigating to the destination based on the position information of the first and second modalities by switching between the first modality and the second modality.

Certain embodiments may provide one or more technical advantages. For example, systems and methods may facilitate seamless navigation in areas which a GPS signal is impaired. Additionally, a system is provided which may allow the direct addressing and mapping of rooms/facilities in a private building from anywhere in the world.

Other technical advantages will be readily apparent to one skilled in the art from the following figures, descriptions and claims. Moreover, while specific advantages have been enumerated above, various embodiments may include all, some or none of the enumerated advantages.

Description

Figure 1:
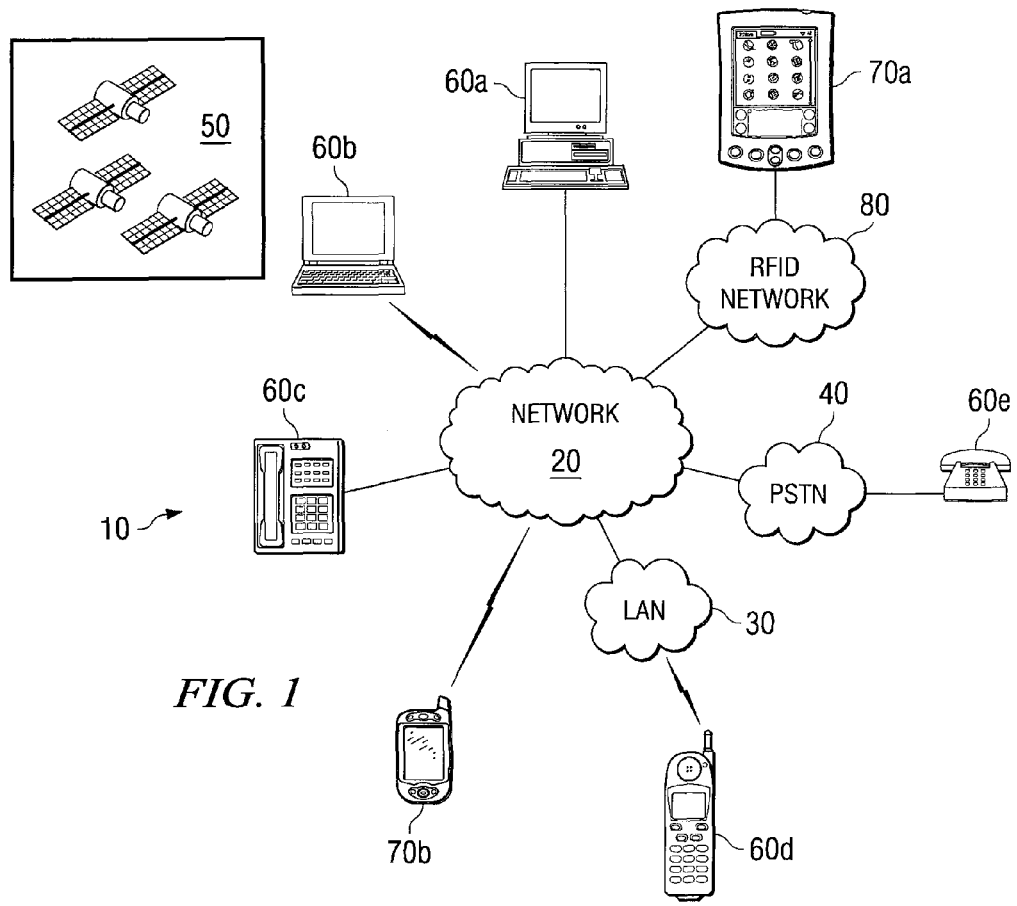
FIG. 1 is a simplified block diagram illustrating a communication system for navigating using multiple modalities according to an embodiment.

FIG. 1 illustrates a communication system 10 for navigating using multiple modalities in accordance with a particular embodiment. As illustrated, communication system 10 includes communication network 20, local area network (LAN) 30, public switched telephone network (PSTN) 40, positioning unit 50, radio frequency identification (RFID) network 80, a plurality of communication devices 60a-60e, and navigation units 70a-70b. In particular embodiments, navigation units 70a-70b are devices capable of communicating with communication devices 60a-60e, positioning unit 50, and RFID network 80. As discussed in further detail below, positioning unit 50 and RFID network 80 may provide position or other location information for navigation units 70a-70b.

Positioning and navigation technologies generally operate by determining the position of a receiver or transmitter relative to a remote transmitter/receiver having a known location. Some systems such as the Global Positioning System (GPS) require that the navigation device be able to communicate with at least three remote transmitters/receivers. GPS may also require a direct line of site between the navigation device and the remote transmitters/receivers. Further, GPS and other satellite based navigation technologies may be limited to an accuracy of several meters even under optimal conditions.

While such limitations may cause few problems when a navigation device is outside, they may severely limit functionality indoors, in tunnels, and in cities having tall buildings. For example, walls and other barriers may prevent a navigation device from sending and/or receiving signals necessary to determine position. Additionally, even if the navigation device is able to communicate with the necessary transmitters/receivers the systems may be limited to navigating a user to the general destination and not to a specific location within a building or other structure. This is, in part, due to accuracy and communication limitations as well as a general unavailability of suitable maps providing floor plans of private buildings.

In accordance with certain embodiments, system 10 may facilitate navigating a user of a navigation unit 70a-70b from a general location such as a city to a specific location such as a conference room in a particular building. More specifically, positioning unit 50 may represent a satellite based navigation system such as GPS which may navigate a user to a general destination such as a building. Once the user reaches the general destination, RFID network 80 may facilitate navigation within the building or other structure. For instance, RFID network 80 may navigate the user to a specific destination such as a conference room. Thus, system 10 may enable a broad range of navigation capabilities.

As illustrated in FIG. 1, communication network 20 represents any network capable of transmitting audio and/or video telecommunication signals, data, and/or messages, including signals, data, or messages transmitted through text chat, instant messaging, and e-mail. Accordingly, communication network 20 may comprise all, or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, communication network 20 may include routers, hubs, switches, gateways, call controllers, and/or any other suitable components in any suitable form or arrangement. Additionally, communication network 20 may include any hardware and/or software configured to communicate information in the form of packets, cells, frames, segments or other portions of data. Although communication network 20 is illustrated as a single network, communication network 20 may comprise any number or configuration of networks. Moreover, certain embodiments of communication system 10 may include any number or configuration of communication networks 20.

Communications over communication network 20 may employ any suitable communication protocol. In particular embodiments, communication network 20 may utilize communication protocols that allow for the addressing or identification of endpoints, nodes, and/or other components coupled to the communication network. For example, using Internet protocol (IP), each of the components coupled together by, communication network 20 may be identified in information directed using IP addresses. In this manner, communication network 20 may support any form and/or combination of point-to-point, multicast, unicast, or other techniques for exchanging media packets among components in communication system 10. Since IP networks share a common method of transmitting data, telecommunication signals may be transmitted between telephony devices located on different, but interconnected, IP networks. In addition to being coupled to other IP networks, communication network 20 may also be coupled to non-IP telecommunication networks, for example through the use of interfaces or components, including gateways.

In particular embodiments, communication network 20 may receive and transmit data in a session initiation protocol (SIP) environment. In such embodiments, particular communication devices 60 and navigation units 70 may be SIP enabled devices. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

LAN 30 provides connectivity between components coupled to LAN 30 using any appropriate communication protocol. LAN 30 also couples such components to communication network 20 to provide connectivity with devices coupled to communication network 20. LAN 30 may represent any hardware and/or software configured to communicate information in the form of packets, cells, frames, segments or other portions of data. Additionally, LAN 30 may include routers, hubs, switches, gateways, call controllers, and/or any other suitable components in any suitable form or arrangement. In particular embodiments, LAN 30 represents all or a portion of an Ethernet network connecting communication devices 60 of a particular entity, such as a company, store, warehouse, and/or other business entity.

PSTN 40 includes switching stations, central offices, mobile telephone switching offices, pager switching offices, remote terminals, and other related telecommunications equipment that may be located throughout the world. PSTN 40 may interface with communication network 20 through a gateway to provide interoperable communication between communication device 60e coupled to PSTN 40 and other devices within communication system 10.

Communication devices 60a-60e ("communication devices 60") may represent any suitable combination of hardware, software, and/or encoded logic to provide communication services to a user. For example, communication devices 60 may represent PSTN telephones; IP phones; cell phones; computers running telephony, e-mail, or other forms of messaging and/or communication software; video monitors; cameras; or any other communication hardware, software, and/or encoded logic that supports communication of voice, video, text or other suitable forms of data using communication system 10. Communication devices 60 may connect to a communication network, such as communication network 20 or LAN 30, in numerous ways. For instance, a connection might be made through a fixed broadband connection such as a digital subscriber line (DSL), cable modem, or Ethernet. Wireless access to communication network 22 may be initiated through a WLAN, WiMAX, or WiFi access point. Further, mobile access may be permitted via code division multiple access (CDMA), CDMA2000, general packet radio service (GPRS), universal mobile telecommunications system (UMTS), evolution-data optimized (EV-DO), GSM, and/or any other suitable mobile standard. While FIG. 1 illustrates a particular number and configuration of communication devices 60, communication system 10 contemplates any number or arrangement of such components to support communication of media.

Positioning unit 50 represents hardware and software, including appropriate controlling logic, capable of generating and communicating information relating to the location of navigation units 70a-70b. For example, as illustrated, positioning unit 50 represents a plurality of satellites in a global navigation satellite system such as the global positioning system (GPS). In certain embodiments, positioning unit 50 may represent a differential GPS (DGPS) system. Accordingly, positioning unit 50 may comprise a network of fixed ground based reference stations operable to broadcast differences between positions identified by a satellite and known fixed positions. Such information may be used to correct errors introduced by selective availability, atmospheric conditions, and/or multipath effects. Components of system 10, such as navigation units 70a-70b, may have suitable hardware and supporting software for communicating directly with positioning unit 50. Additionally, communications with positioning unit 50 may occur indirectly through communication network 20.

RFID network 80 is a network operable to communicate data and other information through wireless radio communications. RFID network 80 may be implemented in an office building, tunnel, or portions of an urban canyon. RFID network 80 may include one or more RFID tags operable to communicate with a RFID reader. In certain embodiments, the RFID tags may store information associated with the location of the tag. Accordingly, RFID communications may include position or other location information associated with a RFID tag. RFID network 80 may also include one or more RFID readers operable to communicate with a RFID tag associated with a device within RFID network 80. Given range limitations which may restrict communications between a RFID reader and a RFID tag, RFID network 80 may be relatively defined by the positioning of the RFID tags. The components and particular embodiments of RFID network 80 are described in greater detail below with respect to FIG. 2.

Navigation units 70*a*-70*b* ("navigation units 70") facilitate interaction between users of communication system 10, positioning unit 50, and RFID network 80. Examples of navigation units 70 include, but are not limited to, personal travel assistants (PTAs), mobile phones, personal digital assistant (PDAs), automotive navigation systems, and/or personal computers (PCs). Navigation units 70 may be operable to communicate audio, and/or video telecommunication signals, data, and/or messages; including signals, data, or messages transmitted through text chat, instant messaging, and e-mail. In general, however, each navigation unit 70 may represent any appropriate collection of hardware and/or software suitable to provide the described functionality. Additionally, while FIG. 1 includes a particular number and configuration of navigation units 70, communication system 10 contemplates any number or arrangement of such components.

Communications between navigation units 70 and components of communication system 10 may employ any suitable mobile or wireless communication standard. In particular, navigation units 70 may connect to communication network 20 using any of the mobile or wireless standards discussed with respect to communication devices 60. Embodiments of navigation units 70 may also include an RFID reader and/or RFID tag to enable communications with RFID network 80. Navigation units 70 may also be equipped with suitable hardware for communicating with positioning unit 50 either directly or indirectly through communication network 20. To facilitate the described communication capabilities, each navigation unit 70 may have a display such as a graphical user interface (GUI), video user interface (VUI), or a textual user interface (TUI), to present suitable information to a user.

In operation, navigation units 70 may generate, receive, and/or communicate position information associated with its location. For purposes of this specification, "position information" may include any signal or other data that either directly provides the location of a navigation unit 70 and/or facilitates the calculation of the location of a navigation unit 70. Such calculations may be performed using any suitable method such as multilateration or trilateration. In certain embodiments, navigation units 70 may use position information obtained from positioning unit 50 and/or RFID network 80 to navigate a user to a general destination such as a city or a specific destination such as a conference room in a building. Similarly, navigation units 70 may also communicate position information to, RFID network 80, positioning unit 50, and/or any other device connected to communication network 20, thereby enabling remote tracking of a navigation unit 70.

According to an embodiment, navigation units 70 may seamlessly switch between receiving position information from RFID network 80 and a GPS network supported by positioning unit 50. As an example, situations may arise where navigation unit 70 is limited to communicating with either RFID network 80 or positioning unit 50. For instance, GPS communications with a positioning unit 50 may be blocked when navigation unit 70 enters a building, tunnel, or urban canyon. In such circumstances, navigation unit 70 may use position information from any component of communication system 10 with which it is able to communicate. By contrast, in situations where navigation unit 70 is able to receive position information from both RFID network 80 and positioning unit 50, navigation unit 70 may use the position information from either component. In an embodiment, navigation unit 70 may switch between using position information generated by positioning unit 50 and position information from RFID network 80 based on certain reliability measurements. Such reliability measurements may include signal strength, number of signals received and/or data within the signal. Thus, as described, a navigation unit 70 may receive position information of multiple modalities from several components of communication system 10.

In an embodiment, navigation units 70 may include or have access to a map database (described with respect to FIG. 3). The map database may maintain and store maps and locations such as streets, business addresses, house numbers, and/or building information. Building information may include a blueprint, floor plan or other suitable map of a building. The locations may be encoded as geographic coordinates such that navigation unit 70 may determine its position relative to a destination input by a user at navigation unit 70. For example, if a user inputs a destination, navigation unit 70 may calculate a distance to the destination location from a current location using the stored map. Further, map database 76 may enable navigation unit 70 to provide the user with information such as driving directions or a best route to the destination. In addition to general directions, the map database may facilitate in navigating a user to a specific location such as a particular conference room in an office building. Because blueprints and maps of a particular building or location may not be publicly available, such information may have to be input into a navigation unit 70. Accordingly, navigation unit 70 may be equipped with hardware and software to receive data and information by any suitable means such as a memory disk, memory card, (universal serial bus) USB port or wireless download.

In particular embodiments, navigation units 70 may identify future locations of the device based on a current location. For example, navigation units 70 may employ dead reckoning to determine future locations. Dead reckoning is a process of estimating a current position based on a previously identified or fixed location, and extrapolating future locations using data such as velocity, time, and direction of movement. Velocity and direction of movement may be calculated using changes and/or updates in the position information received from positioning unit 50 and/or RFID network 80. Thus, if a navigation unit 70 determines its location at each of a first and a second time, a velocity and direction of movement may be calculated by analyzing the change in the position of the navigation unit over the elapsed time period. In certain embodiments, navigation units 70 may combine and/or update the predicted location whenever new position information is received from positioning unit 50.

To illustrate the general interaction of the components of FIG. 1, the following example is provided wherein a user requests navigation unit 70 to navigate the user from a general location to a specific location. For instance, a user may request navigation unit 70 to provide directions from a city to a conference room or office in a particular building. At the outset, navigation unit 70 may determine the current location of the device. If the user is situated in a RFID network 80, navigation unit 70 may use position information from the RFID network to determine a location. Alternatively or additionally, navigation unit 70 may receive position information generated by positioning unit 50. As mentioned, such position information may be received directly from positioning unit 50 or indirectly through communication network 20. Once the current location is determined, navigation unit 70 may search a map database to determine the location of the destination and provide the user with routing directions. While in transit to the building, navigation unit 70 may provide the user with information regarding the user's current location. As an example, while in transit navigation unit 70 may update its location using GPS or other position information generated by positioning unit 50. When the user arrives at the building and is within the range of a RFID network 80 associated with the building, navigation unit 70 may switch over to the RFID network. The RFID network 80 may thereby provide navigation unit 70 with position information which routes the user to the conference room. Accordingly, embodiments of navigation unit 70 are operable to switch between a RFID network 80 and a GPS or other global navigation network.

Figure 2:
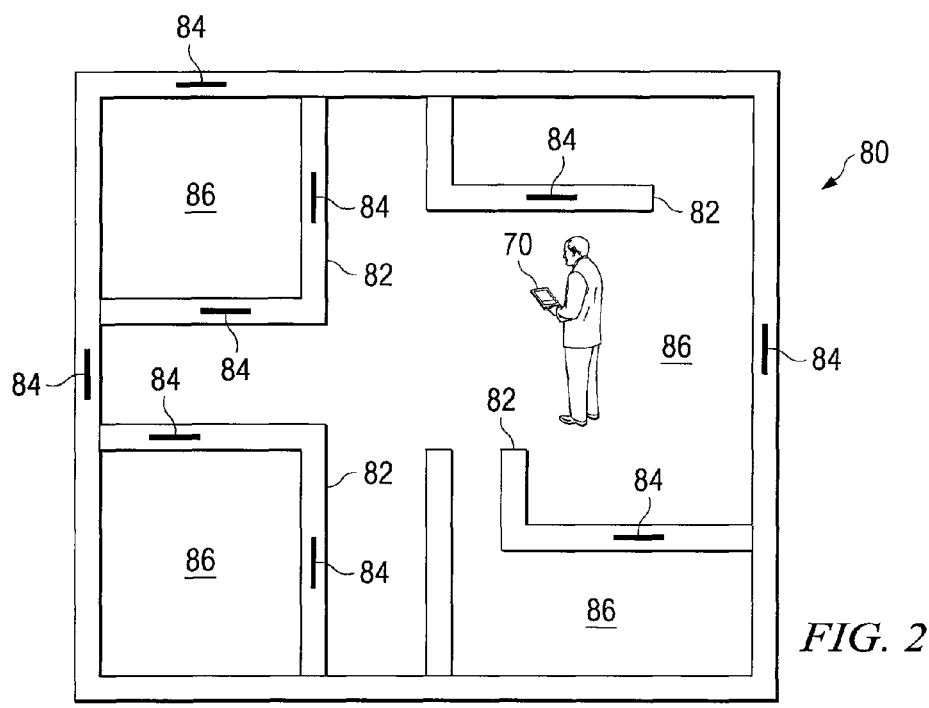
FIG. 2 is a simplified block diagram illustrating an embodiment of a radio frequency identification (RFID) network.

FIG. 2 illustrates a RFID network 80 in accordance with a particular embodiment. In the illustrated embodiment, RFID network 80 includes a plurality of RFID tags 84 operable to communicate with a RFID reader associated with navigation unit 70. Also illustrated are barriers 82 and interior 86 which may represent portions of a building. While a particular number and configuration of components are provided in FIG. 2, such components may be arranged, removed, and/or added without limiting the described capabilities of RFID network 80.

As represented in FIG. 2, barriers 82 are walls of a building, for example an office building, which connect to form interior 86. When a navigation unit 70 is located within interior 86, barriers 82 may obstruct communications from external networks and devices such as communication network 20, positioning unit 50, and communication devices 60 of FIG. 1. Thus, while a user is located within interior 86, navigation unit 70 may be unable to communicate or receive position information from external devices. It should be noted that barriers 82 represent any structure which may obstruct communications to and from external communications devices and networks. Thus, barriers 82 may comprise all or a portion of a bridge, tunnel, ceiling, floor or urban canyon. While a particular configuration of barriers 82 is provided in FIG. 2, RFID network 80 may comprise any number or arrangement of barriers 82. Additionally, in certain embodiments, RFID network 80 may not have any barriers 82.

RFID tags 84 represent transponders which may include a microchip and an antenna. In certain embodiments, the microchip may be encoded with information and data such as the location of the RFID tag 84. The antenna may enable the microchip to transmit the stored information and data to a RFID receiver. Due to limitations in RFID technology, the range that a particular RFID tag 84 may communicate with a RFID receiver may be limited. Thus, the boundaries of RFID network 80 may be relatively defined by the location of RFID tags 84. Additionally, to facilitate navigation and location identification, a particular RFID tag 84 may, in general, be associated with only a single location. To overcome such limitations, RFID network 80 may include any suitable number and configuration of RFID tags 84. As technological advances develop, RFID network 80 may include more, less, or the same number of RFID tags 84. Further, while the illustrated embodiment indicates that RFID tags 84 are located within barriers 82, RFID tags 84 may also be situated on barriers 82, external to barriers 82 or anywhere within RFID network 80.

In operation, RFID tags 84 may communicate position information or other data to a RFID reader associated with a navigation unit 70. The position information may include geographical coordinates or other data relating to a given location. Navigation unit 70 may use the position information to determine its location within interior 86. In an alternate embodiment, RFID tags 84 may communicate an identification (ID) associated with the tag to a RFID reader of a navigation unit 70. Using the ID, navigation unit 70 may search a directory, such as a map database, which associates the ID of a particular RFID tag 84 with a location. For example, a RFID tag with the identity "XYZ123" could be associated with a particular conference room in Building 12 of XYZ Corporation in San Jose, Calif. As mentioned, the directory used to associate the identity of the RFID tag with a location may be installed or otherwise downloaded once a user or navigation unit 70 is granted access to RFID network 80.

In some embodiments, the information stored and transmitted by a RFID tag 84 may be dynamically updated. In particular, an enterprise hosting a RFID network 80 may maintain a database linking RFID tags 84 to dynamic information. To illustrate, assume a conference host has arrived at a conference room and has forgotten a document or other item needed for the conference. The host, through a navigation unit 70 or other device, may dynamically update and/or program a RFID tag 84 proximate the host's office to request the user of the next navigation unit 70 which passes the office to pick up the item. If the user associated with the navigation unit 70 elects to perform the task, the user may confirm that the task will be performed, in which case, the next user passing the RFID tag 84 proximate the host's office will not be alerted with the message.

In particular embodiments, navigation unit 70 may analyze position information received from the RFID tags 84 to provide a user with data such as direction of movement, future location, and/or velocity. For example, assume that a RFID reader associated with a navigation unit 70 receives the following communications from three RFID tags: 1) "South end of South Hall;" 2) "South Middle of the South Hall;" 3) "Middle of the South Hall;" at times 08:00:00, 08:00:10, and 08:00:20, respectively. From this information, navigation unit 70 may determine that the user was heading North for twenty seconds. In certain embodiments, the RFID tags 84 or the building map may provide distance information which enables the navigation unit 70 to calculate a velocity.

To further illustrate the functionality of navigation unit 70 within RFID network 80, the following example is provided wherein a user is located in an office building defined by interior 86 and barriers 82. In this example, communication between navigation unit 70 and positioning unit 50 of FIG. 1 is restricted due to the walls (i.e. barriers 82) of the building. Thus, navigation unit 70 is limited to receiving position information generated by RFID network 80. It should be noted that if navigation unit 70 was able to receive position information from positioning unit 50, it still may not be operable to navigate a user through the building. This may be due to accuracy limitations in current GPS and GSM navigation technologies. Additionally, because many buildings are private, the schematics of a building may not be publicly available. Therefore, while position information received from positioning unit 50 might enable a navigation unit 70 to determine that it is located inside a particular building, the communications would not indicate walls, rooms, doors, and other locations inside the building. Accordingly, navigation unit 70 may guide a user by obtaining position information from RFID tags 84 situated throughout the building.

Elaborating on the above example, upon entering the building, the user may be provided with a memory card that contains a map of the building. The building map may also be available by download to a memory unit of navigation unit 70. For example, if the user is a guest or planned visitor a host associated with the building may grant the user access to download the map prior to arrival. The building map may contain a floor plan of the building which indicates various locations such as bathrooms, conference rooms, offices, etc. As the user moves throughout interior 86, navigation unit 70 may enter into the range of one or more RFID tags 84. When in the transmission range of a RFID tag 84, navigation unit 70 may receive position information and/or other data through a RFID receiver. Using the building map and the position information, navigation unit 70 may provide the user with the present location of the device in the building.

In addition to identifying a location, navigation unit 70 may communicate with RFID tags 84 to navigate a user through a building. For instance, a user may input a destination through a user interface. The destination may be a particular office or conference room in a building or a general location such as a bathroom or cafeteria. In response, navigation unit 70 may determine the location of the closest bathroom or the particular office and provide directions to the destination. While specific capabilities of a navigation unit 70 in an office building have been described in detail, the recited operation and features are provided as examples and are not intended to limit the scope of the present invention. As may be apparent, the described RFID network 80 may be implemented in any suitable environment such as a mall, warehouse, tunnel, etc.

In further embodiments, RFID network 80 may be associated with an enterprise network. The enterprise network may be a communication network such as a LAN, WAN, or network similar to communication network 20 of FIG. 1. When a RFID network 80 is associated with an enterprise network, navigation unit 70 may communicate with and through each network simultaneously. Accordingly, the RFID network 80 may provide position information or other general data to the navigation unit 70 and the enterprise network may provide the navigation unit 70 with device specific information (i.e. information specific to the particular user of the navigation unit 70). As an example, assume that the location of a conference room hosting a meeting changes and the host seeks to notify participants that will physically attend the conference of the change. Due to currently available remote conferencing capabilities, it may be unclear who is going to attend the meeting in person and who is going to remotely connect to the meeting. Thus, when a conference participant arrives at the conference and enters a RFID network 80, navigation unit 70 may send a query to the enterprise communication network associated with the RFID network 80. The query may be a request for recently available data regarding the conference such as an updated location. If a conference update is available, navigation unit 70 may receive a conference update via the enterprise network. If the update is a new conference location/destination, navigation unit 70 may provide the user with navigation instructions to the new destination. Navigation unit 70 may also communicate with RFID network 80 to facilitate remote tracking. To illustrate the remote tracking capabilities of navigation unit 70 the following example is provided wherein a firefighter enters a smoke-filled building. Due to the density of the smoke the firefighter's visibility may be non-existent or severely limited. Thus, the fire fighter may need to be directed to a specific destination such as a rescue location. In this situation, a navigation unit 70 carried by the firefighter may receive position information from RFID tags located throughout the building. The navigation unit may forward the position information and/or current location to a communication device 60 or a second navigation unit 70 positioned at a remote location. A user, such as a fire chief or another firefighter, positioned at the remote location may provide the firefighter directions to the destination. For example, the remote device might determine and/or receive information that the firefighter is in a particular hallway of the building. Using the location of the firefighter the remote user may communicate directions to the rescue location. As the firefighter moves through the building, the navigation unit may receive new or updated position information from subsequent RFID tags and forward the information on to the external device. Accordingly, the navigation unit 70 may be used as a tracking device to locate the current position of the firefighter. In certain situations, multiple firefighters may carry a navigation unit 70 which may be used to locate and track each of the firefighters. Thus, a navigation unit 70 may allow a firefighter to monitor the location of one or more other firefighters as each travel through the building. Although the following description illustrates the ability of a navigation unit 70 to operate as a tracking device with respect to a firefighter engaged in a rescue operation, one skilled in the art will readily recognize that the recited capabilities may be implemented in a variety of situations.

While some embodiments have been described with functionality performed by navigation unit 70, other embodiments may include one or more components external to navigation unit 70 having similar operability. In particular, a server or other processing unit may be coupled to a communication network, such as communication network 20 of FIG. 1. The server may be operable to perform any of the functionality described as performed by navigation unit 70. For instance, the server may receive information from navigation unit 70 or another device such as positioning unit 50 and/or a component of RFID network 80 to monitor and/or determine the location of a navigation unit 70. In certain embodiments, the server may also communicate to navigation unit 70 through navigation unit 70 and/or RFID network 80.

With reference now to FIG. 3, the contents of a navigation unit 70 are illustrated in accordance with a particular embodiment. As shown, navigation unit 70 includes a transmitter/receiver 72, a user interface 74, a processor 73, a memory 75, and a positioning module 71.

In the illustrated embodiment, transmitter/receiver 72 may receive signals from positioning unit 50 and RFID tags 84 in RFID network 80. More specifically, transmitter/receiver may represent hardware and software capable of obtaining position information from a GPS satellite or RFID tag. Transmitter/receiver 72 may also transmit and receive communications such as audio, video, and other data to and from other network components including, but not limited to, communication devices 60. In certain embodiments, transmitter/receiver 72 may receive data regarding the velocity or direction of movement of navigation unit 70.

User interface 74 provides a mechanism through which a user of navigation unit 70 may operate the device and communicate with other network components. User interface 74 may include a keypad, display, touch screen, audio input or any other suitable interface. A user may submit instructions for navigation unit 70 via interface 74 in a multitude of ways such as through a collection of keystrokes, soft keys, and/or a speech recognition program such as an internal voice recognition (IVR) system. Additionally, user interface 74 may also include a GUI, TUI, or VUI.

Processor 73 may execute commands submitted by a user as well as other instructions associated with the services provided by navigation unit 70. Processor 73 may represent any suitable device(s) capable of processing and/or communicating electronic information. Examples of processor 73 include, but are not limited to, application-specific integrated circuits (ASICs), field-programmable gate arrays (FGPAs), digital signal processors (DSPs), and any other suitable specific or general purpose processors.

Memory 75 may store processor instructions or any other appropriate information used by navigation unit 70. For example, memory 75 may store a map of a particular building once downloaded or otherwise received by a navigation unit. Memory 75 may include any collection and arrangement of volatile or non-volatile, local or remote devices suitable for storing data. Examples of memory 75 include, but are not limited to, random access memory (RAM) devices, dynamic random access memory (DRAM), read only memory (ROM) devices, magnetic storage devices, optical storage devices, flash memory, or any other suitable data storage devices. In an embodiment of the present invention, memory 75 maintains map database 76, position database 77, and preference database 78. Although, as illustrated, memory 75 includes particular data elements, it should be understood that memory 75 may maintain any suitable information for use in operating navigation unit 70.

Map database 76 may include one or more maps for use in operating navigation unit 70. In particular, map database 76 may comprise any number of road maps or atlases. Additionally, map database 76 may maintain house numbers and other addresses. In certain embodiments map database 76 may store information regarding retail stores, businesses, restaurants, etc. Map database 76 may also store building maps, including floor plans, downloaded by a user. Additionally, while map database 76 is illustrated as residing within memory 75 of navigation unit 70, map database 76 may be located anywhere within communication system 10 and may be accessible by navigation unit 70 via communication(s) with various components of communication system 10.

Position database 77 includes position information generated by positioning module 71 and stored for use by positioning module 71 or processor 78. The stored position information may be used by positioning module 71 to calculate the velocity and direction of movement of navigation unit 70.

Preference database 78 includes one or more user preferences regarding the operation of navigation unit 70. For example, preference database 78 may include privacy settings such as whether to enable tracking of the navigation unit. Preference database 78 may also include policies such as security settings, bandwidth limitations, and whether to use position information from RFID network 80 and/or positioning unit 50 when navigation unit is able to receive position information of each modality. Although specific preferences are listed, note that preference database 78 may include any number of the listed preferences in addition to alternate preferences.

Positioning module 71 represents any suitable combination of hardware and/or controlling logic capable of determining the actual and/or future location of navigation unit 70. As represented in FIG. 3, positioning module 71 may calculate both the position of navigation unit 70 using any suitable technique such as multilateration or trilateration. Additionally, positioning module 71 may communicate with position database 77 to store position information and obtain prior position information for use in making further calculations such as velocity and direction of movement.

In operation, positioning module 71 may, for example in connection with processor 73, analyze position information received by transmitter/receiver 72 from positioning unit 50 and/or RFID network 80. Using the position information, positioning module 71 may identify the location of the navigation unit 70. Upon determining the location of the navigation unit 70, positioning module 71 may find the location on a map stored in the map database 76. Additionally, positioning module may also compare the current location with a destination to generate directions to the destination. Positioning module 71 may also use data stored in position database 77 to determine a velocity and direction of movement of the navigation unit 70. It should be noted that the described interactions represent only one of many ways in which the components of a navigation unit 70 may provide the recited functionality.

Referring now to FIG. 4, a flowchart describing an example operation of an embodiment of navigation unit 70 in navigating using multiple modalities is provided. The described method begins at step 400 wherein a destination is identified. The destination may be input by a user and navigation unit 70 may thereby determine the location of the destination. As an example, the destination may be general, such as a building hosting a conference. The destination may also be specific, such as a conference room where a conference is to occur. The location of the destination may be determined using a map stored in a memory unit of navigation unit 70 or through communications with one or more devices within communication system 10. If navigation unit 70 has access to a map of the building (i.e. the user previously downloaded the map, inserted a memory card storing the map, or access is permitted via communications with devices in communication system 10), then navigation unit may determine the location of the specific destination. Alternatively, if navigation unit 70 does not have access to the building map, navigation unit 70 may determine the location of the destination to the extent which a currently available map allows.

At step 410, navigation unit 70 may receive position information of a first modality. For illustrative purposes, the position information of a first modality may be position information associated with a GPS system or device such as, for example, positioning unit 50. Based on the position information, navigation unit 70 may determine a current location relative to the identified destination at step 420. In addition, at step 430, navigation unit 70 may generate directions to the destination from the current location. If navigation unit 70 was previously able to identify the location of the specific destination (i.e. the conference room), then directions may be provided to the specific destination.

While in transit to the destination, the user may arrive at a general or intermediate destination en route to the specific destination. As mentioned, the general destination may be a building or other structure at the edge of a RFID network 80. At this point, if navigation unit 70 does not have access to a map of the building a host or other building attendant may provide the user with a memory card or other suitable storage or data transfer module that contains a map of the building. In some embodiments, the navigation unit may use network 20 or LAN 30 to download the relevant information from a server such as a map server attached to the network.

Next, at step 440 navigation unit 70 may receive position information of a second modality. As an example, position information of a second modality may be position information associated with a RFID network, such as RFID network 80. Accordingly, the building or structure which the user identified as a destination may contain one or more RFID tags 84. Each of the RFID tags 84 may be associated with a location in the building and be operable to transmit position information associated with the location. Using the position information, navigation unit 70 may, at step 450, determine a current location of the device based on the a map associated with the RFID network. In certain embodiments, navigation unit 70 may be operable to continuously update and display the location of the device as a user travels from an initial location to the destination. The illustrated method ends at step 460 with the user arriving at the destination.

Modifications, additions, or omissions may be made to the method depicted in FIG. 4. In certain embodiments, steps may be performed in any suitable order without departing from the scope of the invention. For example, the position information of the first and second modalities may be reversed. Thus, position information of a first modality may be position information associated with a RFID network and position information of a second modality may be position information associated with a GPS system. Additionally, the method may include more, fewer, or other steps to support the described functionality of navigation unit 70.

While the present invention has been described in detail with reference to particular embodiments, numerous changes, substitutions, variations, alterations and modifications may be ascertained by those skilled in the art, and it is intended that the present invention encompass all such changes, substitutions, variations, alterations and modifications as falling within the spirit and scope of the appended claims.

What is claimed is:

1. A system for navigating comprising:
    an interface operable to:
        receive an identification of a destination inside a building;
        receive position information of a first modality comprising global positioning satellite (GPS) information, the position information of the first modality associated with a navigation unit;
    a processor coupled to the interface, wherein the processor is operable to:
        determine directions from a current location of the navigation unit to the destination inside the building;
        detect that the navigation unit is within range of a radio frequency identification (RFID) network associated with the building, the building comprising a plurality of RFID tags;
    wherein the interface is further operable to:
        receive RFID position information of the navigation unit;
    the processor further operable to:
        navigate to the destination inside the building based on the GPS and RFID position information by automatically switching from GPS to RFID upon the detection that the navigation unit is within range of the RFID network associated with the building, wherein the processor utilizes GPS information outside the building and RFID information inside the building for the navigation; and
    wherein the processor is further operable to receive instructions to dynamically program one or more RFID tags of the plurality of RFID tags to transmit a user request to a navigation unit in the RFID network.

2. The system of claim 1, wherein the processor is further operable to analyze the RFID position information of the navigation unit to determine a direction of movement.

3. The system of claim 1, wherein the processor is further operable to analyze the RFID position information of the navigation unit to determine a distance traveled.

4. The system of claim 1, further comprising a memory operable to store a map associated with the RFID network.

5. The system of claim 4, wherein:
    the map is associated with a building; and
    the destination is a location within the building.

6. The system of claim 4, wherein the processor is further operable to determine a location of the navigation unit based on the map associated with the RFID network.

7. The system of claim 1, wherein the processor is further operable to send a query to a communication network associated with the RFID network in response to entering the RFID network.

8. The system of claim 7, wherein the query comprises a request for an updated destination.

9. The system of claim 8, wherein:
    the interface is further operable to receive a response to the query; and
    the response comprises an updated destination.

10. The system of claim 1, wherein the interface is further operable to receive a request from one or more RFID tags of the plurality of RFID tags, wherein the request is associated with the location of the RFID tag.

11. The system of claim 1, wherein the processor is further operable to:
    search a directory associated with the RFID network; and
    determine a location of the navigation unit based on the directory.

12. A computer-implemented method for navigating comprising:
    identifying, with a processor, a destination inside a building;
    receiving, at an interface of a navigation unit, position information of a first modality comprising global positioning satellite (GPS) information, the position information of the first modality associated with the navigation unit;
    determining, with the processor, directions from a current location of the navigation unit to the destination inside the building;
    detecting, with the processor, that the navigation unit is within range of a radio frequency identification (RFID) network associated with the building, the building comprising a plurality of RFID tags;
    receiving, at the interface of the navigation unit, RFID position information of the navigation unit;
    navigating, with the processor, to the destination inside the building based on the GPS and RFID position information by automatically switching from GPS to RFID upon the detection that the navigation unit is within range of the RFID network associated with the building, wherein the processor utilizes GPS information outside the building and RFID information inside the building for the navigation; and
    receiving instructions to dynamically program a RFID tag of the plurality of RFID tags to transmit a user request to a navigation unit in the RFID network.

13. The method of claim 12, further comprising analyzing the RFID position information of the navigation unit to determine a direction of movement.

14. The method of claim 12, further comprising analyzing the RFID position information of the navigation unit to determine a distance traveled.

15. The method of claim 12, further comprising storing a map associated with the RFID network.

16. The method of claim 15, wherein:
    the map is associated with a building; and
    the destination is a location within the building.

17. The method of claim 15, further comprising determining a location of the navigation unit based on the map associated with the RFID network.

18. The method of claim 12, further comprising sending a query to a communication network associated with the RFID network in response to entering the RFID network.

19. The method of claim 18, wherein the query comprises a request for an updated destination.

20. The method of claim 19, further comprising receiving a response to the query, wherein the response comprises an updated destination.

21. The method of claim 12, further comprising receiving a request from one or more RFID tags of the plurality of RFID tags, wherein the request is associated with the location of the RFID tag.

22. The method of claim 12, further comprising:
searching a directory associated with the RFID network; and
determining a location of the navigation unit based on the directory.

23. Logic embedded in a non-transitory computer readable medium, the computer readable medium comprising code operable to:
identify a destination inside a building;
receive position information of a first modality comprising global positioning satellite (GPS) information, the position information of the first modality associated with the navigation unit;
determine directions from a current location of the navigation unit to the destination inside the building;
detect that the navigation unit is within range of a radio frequency identification (RFID) network associated with the building, the building comprising a plurality of RFID tags;
receive RFID position information of the navigation unit;
navigate to the destination inside the building based on the GPS and RFID position information by automatically switching from GPS to RFID upon the detection that the navigation unit is within range of the RFID network associated with the building, wherein the code utilizes GPS information outside the building and RFID information inside the building for the navigation; and
receive instructions to dynamically program one or more RFID tags of the plurality of RFID tags to transmit a user request to a navigation unit in the RFID network.

24. The logic of claim 23, wherein the code is further operable to analyze the RFID position information of the navigation unit to determine a direction of movement.

25. The logic of claim 23, wherein the code is further operable to analyze the RFID position information of the navigation unit to determine a distance traveled.

26. The logic of claim 23, wherein the code is further operable to store a map associated with the RFID network.

27. The logic of claim 26, wherein:
the map is associated with a building; and
the destination is a location within the building.

28. The logic of claim 26, wherein the code is further operable to determine a location of the navigation unit based on the map associated with the RFID network.

29. The logic of claim 23, wherein the code is further operable to send a query to a communication network associated with the RFID network in response to entering the RFID network.

30. The logic of claim 29, wherein the query comprises a request for an updated destination.

31. The logic of claim 30, wherein:
the code is further operable to receive a response to the query; and
the response comprises an updated destination.

32. The logic of claim 23, wherein the code is further operable to receive a request from one or more RFID tags of the plurality of RFID tags, wherein the request is associated with the location of the RFID tag.

33. The logic of claim 23, wherein the code is further operable to:
search a directory associated with the RFID network; and
determine a location of the navigation unit based on the directory.

34. A system for navigating comprising:
means for identifying a destination inside a building;
means for receiving position information of a first modality comprising global positioning satellite (GPS) information, the position information of the first modality associated with the navigation unit;
means for determining, with the processor, directions from a current location of the navigation unit to the destination inside the building;
means for detecting that the navigation unit is within range of a radio frequency identification (RFID) network associated with the building, the building comprising a plurality of RFID tags;
means for receiving RFID position information of the navigation unit;
means for navigating to the destination inside the building based on the GPS and RFID position information by automatically switching from GPS to RFID upon the detection that the navigation unit is within range of the RFID network associated with the building, wherein the means for navigating to the destination utilizes GPS information outside the building and RFID information inside the building for the navigation; and
means for receiving instructions to dynamically program one or more RFID tags of the plurality of RFID tags to transmit a user request to a navigation unit in the RFID network.

35. The system of claim 1, wherein the processor further operable to program one or more RFID tags to transmit a request to a navigation unit in the RFID network comprises the processor operable to:
program one or more RFID tags to transmit a request to each navigation unit coming in proximity to the one or more RFID tags; and
reprogram the one or more RFID tags to stop transmission of the request to each navigation unit coming in proximity to the one or more RFID tags upon receiving an indication message.

36. The system of claim 35, wherein the indication message represents a task completion.

* * * * *